(12) United States Patent
Straub et al.

(10) Patent No.: US 7,503,442 B2
(45) Date of Patent: Mar. 17, 2009

(54) FREEWHEEL COUPLING

(75) Inventors: Frank Straub, Hohenroth (DE); Frieder Altmann, Pommersfelden (DE)

(73) Assignee: Schaeffler KG, Herzogenaurach (DE)

( * ) Notice: Subject to any disclaimer, the term of this patent is extended or adjusted under 35 U.S.C. 154(b) by 211 days.

(21) Appl. No.: 11/537,698

(22) Filed: Oct. 2, 2006

(65) Prior Publication Data

US 2007/0074946 A1 Apr. 5, 2007

(30) Foreign Application Priority Data

Sep. 30, 2005 (DE) .................. 10 2005 047 020

(51) Int. Cl.
*F16D 41/07* (2006.01)
(52) U.S. Cl. .............. 192/45.1; 192/41 A; 192/107 T
(58) Field of Classification Search ............ 192/45.1, 192/41 A
See application file for complete search history.

(56) References Cited

U.S. PATENT DOCUMENTS 2,683,510 A * 7/1954 Troendly .............. 192/45.1
2,803,324 A * 8/1957 Dodge ................ 192/45.1
4,880,093 A * 11/1989 Message ............. 192/45.1
6,732,843 B2 * 5/2004 Miura et al. ......... 192/45.1
2007/0074947 A1 * 4/2007 Straub et al. ........ 192/45.1

FOREIGN PATENT DOCUMENTS

DE 8014018 U1 8/1980
WO WO 2004079220 * 9/2004

* cited by examiner

*Primary Examiner*—Richard M. Lorence
(74) *Attorney, Agent, or Firm*—Volpe and Koenig, P.C.

(57) ABSTRACT

A freewheel coupling (1) is provided having a gap (12) formed between a bearing inner ring (2) and a bearing outer ring (3). At least one of the bearing rings (1, 2) is constructed as a sleeve formed using a non-cutting method. Clamping bodies (6) are arranged in the gap (12) and have a throat (7). A spring band (13) with spring tongues (14), which are aligned tangentially, and which can be deflected in the radial direction, contact the clamping bodies (6) in the area of the throats (7). A cage (17) with recesses (18) that holds the clamping bodies (6) is arranged radially outside of the spring band (13) in the gap (12).

4 Claims, 2 Drawing Sheets

FREEWHEEL COUPLING

FIELD OF THE INVENTION

The invention relates to a freewheel coupling or overrunning clutch with clamping elements, which are arranged in a gap between a bearing inner ring and a bearing outer ring and which are guided in recesses of a cage, with a continuous spring band being provided for spring mounting of the clamping elements.

BACKGROUND OF THE INVENTION

A freewheel coupling of the above-noted type is known, for example, from DE 80 14 018 U1. This freewheel coupling has a sleeve as a bearing outer ring, which can be embodied like a needle bearing sleeve surrounding the bearing needles. The bearing outer ring is suitable for pressing into a bore of a part, in which the freewheel coupling is to be mounted. The clamping elements of the freewheel coupling are secured against falling inwardly out of position, in that cage pockets guiding the clamping elements converge in the direction towards the shaft. The clamping elements are not secured from falling outwardly out of position, if the cage including the clamping elements is not located in the sleeve.

SUMMARY

The invention is based on the objective of providing a freewheel coupling, which distinguishes itself through economical production methods and also, in particular, multi-purpose applicability.

This objective is met by the freewheel coupling according to the invention. The present freewheel coupling has clamping bodies, which are guided in a cage between a bearing inner ring and a bearing outer ring and which have a reduced-size shape. The reduced-size section, i.e., the throat of the clamping body, is located approximately in the center between the bearing inner ring and the bearing outer ring and is formed on both sides. A clamping body arranged in the gap between the bearing inner ring and the bearing outer ring thus has two concavely curved surface sections, which together describe the throat of the clamping body. Each clamping body is contacted in the area of its throat by a spring tongue, which is part of a single circular spring band in the gap.

Here, the individual spring tongues are directed tangentially and can be deflected in the radial direction, and the spring tongues bear on the clamping bodies with a force in a direction towards the clamping position. The ends of the spring band preferably overlap and are not connected to each other. Thus, the effective periphery of the spring band is not exactly defined, but the position of the spring band is given in the gap by the position of the throat of clamping bodies. Thus, the spring band arranged approximately in the center between the bearing inner ring and the bearing outer ring is located radially within a cage, which has recesses for holding the clamping bodies. A construction of the cage, which prevents the clamping bodies from falling inwardly out, is unnecessary, because the clamping bodies are already secured by the spring band from falling out both inwardly and also outwardly. The entire spring band is preferably biased against the cage in the unassembled state; in the assembled state, the spring band is aligned with the clamping body reduced-diameter sections. The positioning of the cage, which is preferably made from plastic, especially from a fiber-reinforced plastic, is guided on the outside, that is, it is guided by the bearing outer ring. Here, the cage is at least slightly movable relative to the spring band both in the circumferential direction and also in the radial direction. The cage is mounted so that it floats on the spring band and is guided on the outside. The bearing outer ring and/or the bearing inner ring is constructed as a sleeve made using a non-cutting method in an especially economical way. This sleeve is pressed into a bore of a solid connecting part, for example, a housing, or is pressed onto a shaft. The thin-wall construction of the sleeve or the sleeves offers, in particular, multi-purpose options for connecting the freewheel coupling between structures. It is especially advantageous that a connection bore, in which the outer sleeve of the freewheel can be pressed with overlapping, does not need to be hardened. This applies analogously for a shaft, on which an inner sleeve of the freewheel can be pressed.

In a preferred construction, the single cage of the freewheel coupling has contact surfaces, which define the recess and form a stop for the clamping body. A contact surface can fulfill various functions: first, a clamping body located in a freewheel position can be lifted from the bearing inner ring by the resulting centrifugal force at a sufficiently high rotational speed of the bearing outer ring and can be stopped on the contact surface of the cage, wherein the clamping disk is only slightly removed from the bearing inner ring in a desired way, in order to be able to quickly re-establish a non-positive-fit connection between the bearing outer ring and the bearing inner ring. Second, there is the possibility of transferring a static load acting in the radial direction from the inner ring via the clamping body and the cage, on which the clamping body contacts the contact surface, to the bearing outer ring. In this loading state, the cage contacts the bearing outer ring, which is otherwise not the case, especially for clamping bodies located in the clamping position.

The recesses of the cage holding the clamping bodies, in a preferred construction, are more expanded in the circumferential direction than would be necessary just for holding the clamping bodies. In addition to a first area, in which the clamping body is held, the recess has an area, which is adjacent to this first area in the circumferential direction, which is narrower in the axial direction, and which allows the spring tongues to extend radially in the direction towards the bearing outer ring. The spring tongue is arranged axially between the contact surfaces for the clamping body, which form the boundaries between the narrower and the wider areas of the recess.

BRIEF DESCRIPTION OF THE DRAWINGS

Below, an embodiment of the invention is explained in more detail with reference to the drawings. Shown herein are.

DETAILED DESCRIPTION OF THE PREFERRED EMBODIMENTS

Figure 1:
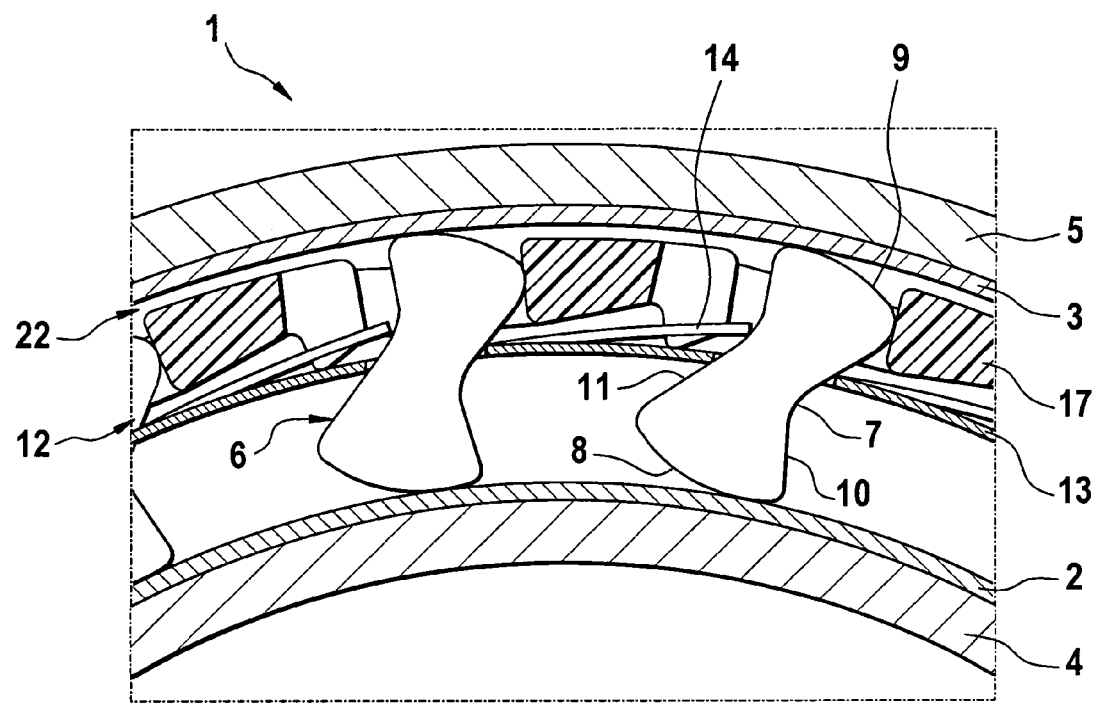
FIGS. 1 and 2 are cross-sectional views of different sections of a freewheel coupling.
Figure 2:
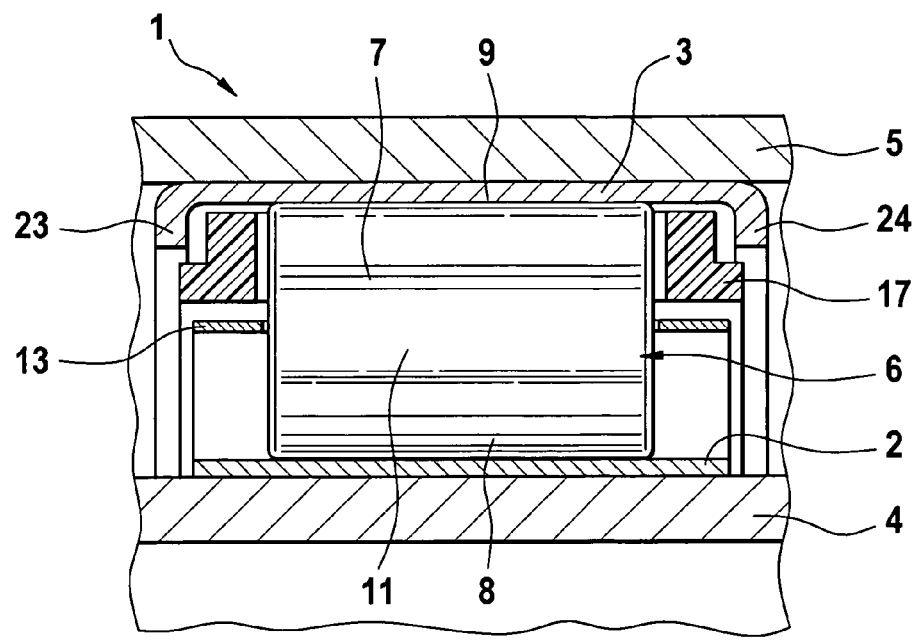

In simplified cross-sectional representations, FIGS. 1 and 2 show a freewheel coupling 1 with a bearing inner ring 2 and a bearing outer ring 3, which are constructed as sleeves formed using a non-cutting method, similar to a sleeve of a needle bearing. Accordingly, the outer surface of the bearing inner ring 2 and also the inner surface of the bearing outer ring 3 are configured as roller bearing tracks with a surface hardness of at least 670 HV. While the bearing inner ring 2 is locked in rotation on a shaft 4, the bearing outer ring 3 is pressed into the bore of a connection part 5. The press fit is sufficiently stable to prevent wandering of the bearing outer ring 3, which, in proper operation, can be exposed to both compression and tension loads. The function of the shown freewheel coupling 1 corresponds to the function of a conventional clamping body freewheel coupling, as described, for example, in DE 103 10 225 A1.

The freewheel function is created by clamping bodies 6, which contact the bearing rings 2, 3, and which have a throat 7 also designated as a reduced-diameter section. Each clamping body 6 has four circumferential sections in the cross section according to FIG. 1, namely a convexly curved inner section 8 facing the bearing inner ring 2, a similarly convexly curved outer section 9 facing the bearing outer ring 3, and also two longitudinal sections 10, 11, which lie between the mentioned sections 8, 9 and which connect these sections, with a concave shape that forms the throat 7.

Figure 3:
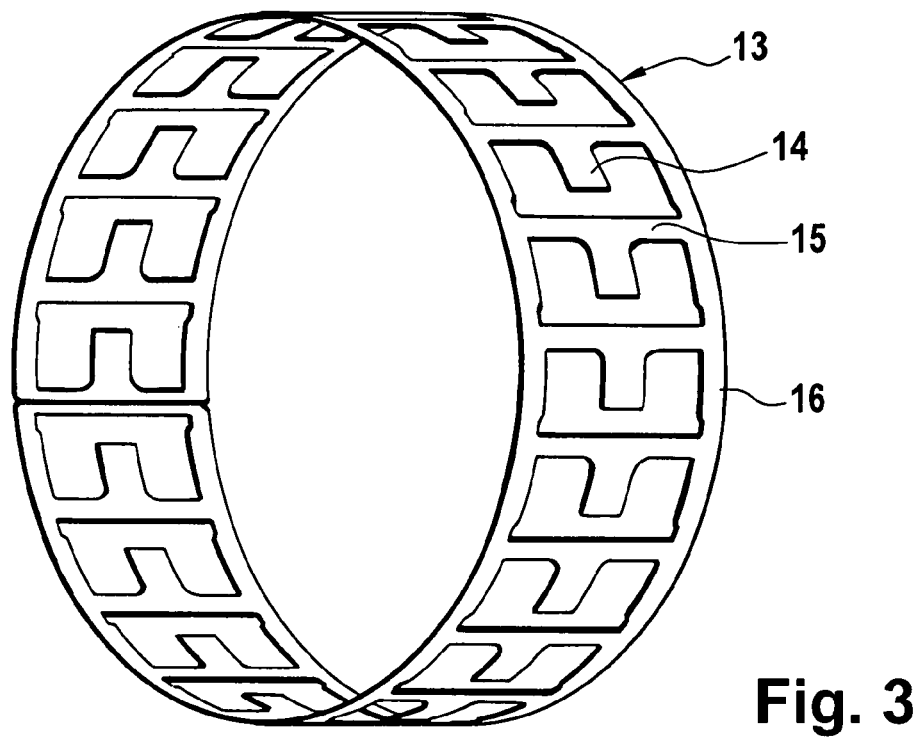
FIG. 3 is a perspective view of a spring band of the freewheel coupling from FIGS. 1 and 2.

In the gap designated with the reference symbol 12 between the bearing inner ring 2 and the bearing outer ring 3, there is a spring band 13, which is shown separately in FIG. 3. The radial position of the spring band 13 arranged concentrically between the bearing inner ring 2 and the bearing outer ring 3 corresponds approximately to the position of the throats 7, with which the spring band 13 is located approximately in the center in the gap 12. Each of the clamping bodies 6 is spring mounted by a spring tongue 14 of the spring band 13, which is aligned at least approximately tangentially according to the arrangement of the spring band 13. In the freewheel position shown in FIG. 1 for the clamping bodies 6, the spring tongues 14 are deflected somewhat outwards. For the transition into the not-shown clamping position, the clamping bodies 6 are tilted in the counter-clockwise direction, with the spring tongues 14 pivoting radially inwards. The clamping position is reached, for example, when, in the arrangement according to FIG. 1, the shaft 4 is pivoted in the clockwise direction and here transfers a torque to the connection part 5.

Figure 4:
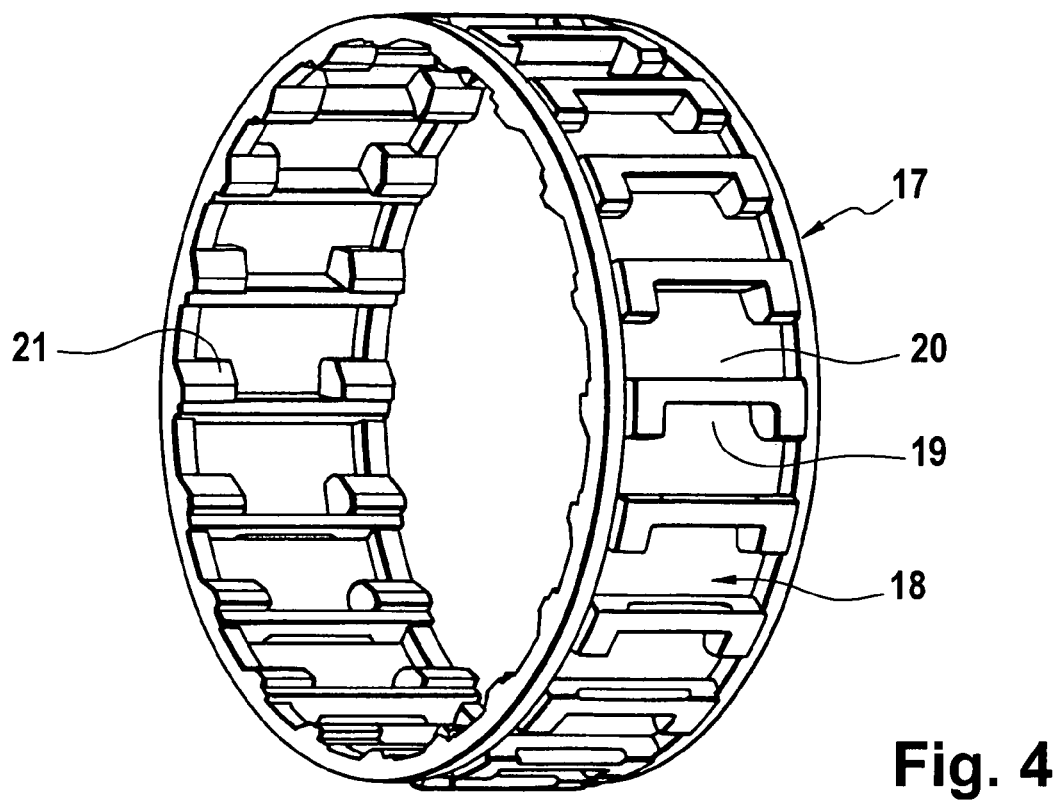
FIG. 4 is a perspective view of a cage of the freewheel coupling from FIGS. 1 and 2.

Each spring tongue 14 is formed on a spring crosspiece 15 running in the axial direction, which, in turn, is connected integrally to surrounding spring rims 16. The entire spring band 13 is biased against a cage 17, which surrounds this band radially and which is shown separately in FIG. 4. The cage 17, made from glass fiber-reinforced plastic, has recesses 18 for holding the clamping bodies 6, wherein each recess 18 is comprised of an area 19 that is narrower in the axial direction and an area 20 that is wider in the axial direction and thus describes the shape of a flat T in the radial plan view. At the transition between the narrower area 19 and the wider area 20 of the recess 18 there is a contact surface 21, which forms a stop for the concave longitudinal section 11 of the clamping body 6. If the clamping body 6 tilts farther in the direction of the freewheel position, i.e., in the clockwise direction, starting from the position shown in FIG. 1, then the longitudinal section 10 comes into positive-fit contact on the contact surface 21 set at an angle relative to the bearing rings 2, 3. If this tilting process happens due to the effect of a centrifugal force on the clamping body 6, then this body lifts slightly from the bearing inner ring 2. Thus, in a desired way, any friction between the clamping body 6 and the bearing inner ring 2 is canceled.

Independent of the rotation of the bearing inner ring 2 and also the bearing outer ring 3, can result in a force transfer between the bearing rings 2, 3 in the radial direction when the clamping body 6 contacts the contact surface 21 of the cage 17. In this case, a gap 22 that can be recognized in FIG. 1 between the cage 17 and the bearing outer ring 3 is closed, wherein the entire gap 12 is slightly narrowed by the radial load between the bearing rings 2, 3. In other words: in the case of a static radial load between the bearing inner ring 2 and the bearing outer ring 3, there is at least a slight eccentricity between the bearing rings 2, 3. To prevent this, the possibility can be provided to connect the cage 17 to not-shown sliding disks for producing a sliding bearing between the bearing inner ring 2 and the bearing outer ring 3.

As is visible from FIG. 2, the bearing outer ring 3 has rims 23, 24, which fix the axial position of the cage 17 and thus also the clamping body 6. The cage 17 is located radially exclusively outside of the center of the gap 12. In contrast to the bearing outer ring 3, the bearing inner ring 2 in the shown embodiment has no rim and thus allows an axial displacement of the clamping body 6. Alternatively, embodiments with one-sided rims or two-sided rims on the bearing inner ring 2 can also be realized.

LIST OF REFERENCE SYMBOLS

1 Freewheel coupling
2 Bearing inner ring
3 Bearing outer ring
4 Shaft
5 Connection part
6 Clamping body
7 Throat
8 Inner section
9 Outer section
10 Longitudinal section
11 Longitudinal section
12 Gap
13 Spring band
14 Spring tongue
15 Spring crosspiece
16 Spring rim
17 Cage
18 Recess
19 Narrower area
20 Wider area
21 Contact surface
22 Gap
23 Rim
24 Rim

The invention claimed is:

1. Freewheel coupling, comprising
a gap formed between a bearing inner ring and a bearing outer ring, wherein at least the bearing outer ring is constructed as a sleeve formed using a non-cutting method, the bearing outer ring including inwardly projecting rims,
clamping bodies arranged in the gap and having a throat,
a spring band with spring tongues, which are aligned tangentially, which can deflect in a radial direction, and which contact the clamping bodies in an area of the throats,
a cage with recesses for holding the clamping bodies, which is arranged radially outside of the spring band in the gap, and the cage has a contact surface for the clamping bodies loaded in the radial direction.

2. Freewheel coupling according to claim 1, wherein the cage is made from plastic.

3. Freewheel coupling according to claim 1, wherein the cage is spaced apart from the bearing outer ring radially at least in a load-free state.

4. Freewheel coupling according to claim 1, wherein a recess of the cage has a first area holding the clamping body and also an area, which is adjacent to the first area in a circumferential direction, which is narrower in an axial direction, and which allows a radial deflection of the spring tongue in the direction towards the bearing outer ring.

* * * * *